United States Patent [19]
Miller et al.

[11] Patent Number: 5,730,236
[45] Date of Patent: Mar. 24, 1998

[54] ADJUSTABLE POWERED WHEELCHAIR

[76] Inventors: Fritz Wendell Miller, 43850 Ross Dr., Soldotna, Ak. 99669; Horace James Van Sickel, P.O. Box 2653, Kenai, Ak. 99611-2653

[21] Appl. No.: 450,925

[22] Filed: May 26, 1995

Related U.S. Application Data

[63] Continuation-in-part of Ser. No. 191,629, Feb. 4, 1994, abandoned.

[51] Int. Cl.⁶ ............................................. B62D 33/063
[52] U.S. Cl. .................... 180/65.1; 180/68.5; 180/326; 180/907; 297/344.17; 297/344.23; 414/921
[58] Field of Search .............................. 280/657, 304.1; 180/65.1, 65.6, 65.8, 68.5, 89.13, 907, 326, 329; 414/921; 297/DIG. 10, 344.1, 344.12, 344.14, 344.17, 344.15, 344.23

[56] References Cited

U.S. PATENT DOCUMENTS

| | | | |
|---|---|---|---|
| 2,833,367 | 5/1958 | Pool et al. | 180/326 |
| 3,888,463 | 6/1975 | O'Brien et al. | 414/921 |
| 4,971,510 | 11/1990 | Houle | 180/326 |
| 5,127,699 | 7/1992 | Maezawa et al. | 180/326 |

FOREIGN PATENT DOCUMENTS

| | | | |
|---|---|---|---|
| 1095462 | 2/1981 | Canada | 414/921 |
| 2477012 | 9/1981 | France | 414/921 |
| 2017014 | 3/1978 | United Kingdom | 414/921 |

*Primary Examiner*—Anne Marie Boehler
*Attorney, Agent, or Firm*—Michael J. Tavella

[57] ABSTRACT

A steerable, powered wheelchair with a mobile base, and two movable arms that are attached to a seat. The seat is attached to the arms with pivots that permit rotation of the seat in both vertical and horizontal planes. The arms can move through three positions. The first position is the at rest position. Here, the seat rests near or directly on the base. In the second position, the seat is spaced vertically above the mobile base. In the third position, the seat is extended forward of the mobile base 2 and can drop down to floor or ground level. A feature of the mobile base it that when the seat is in the third position, the mobile base can rotate vertically about the front wheels. This allows the wheelchair to run on two wheels, increasing the wheelchair's angular mobility. In this operational mode, the user can exercise his or her legs by bouncing them against the ground. Such bouncing while moving in a forward direction, can even simulate running or hopping, which helps exercise the user and offers an increased level of interaction and play for the user.

19 Claims, 8 Drawing Sheets

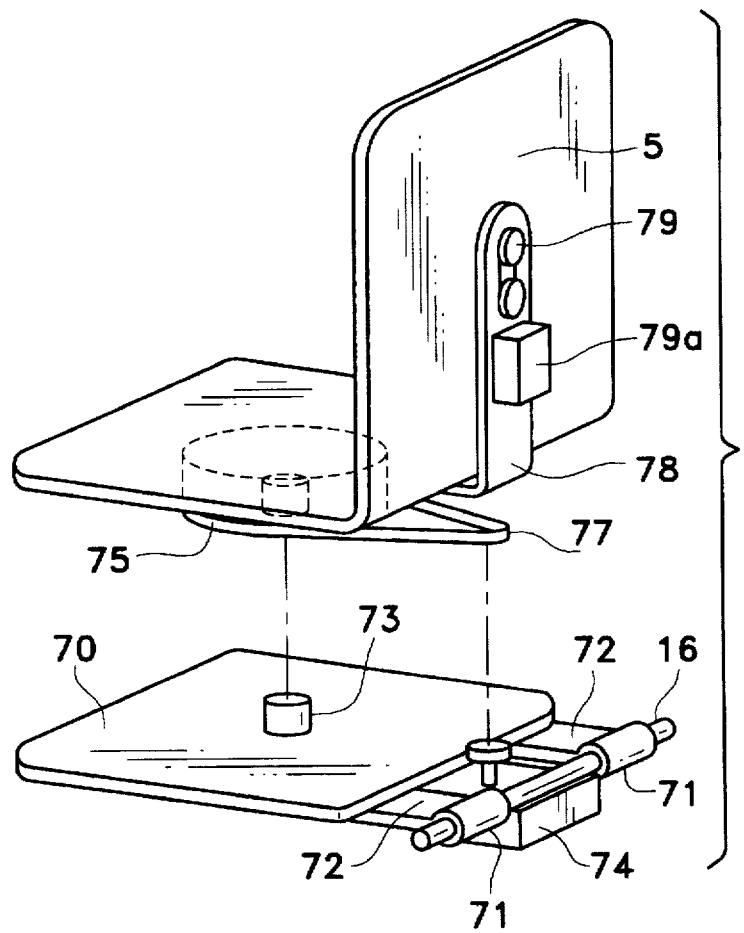
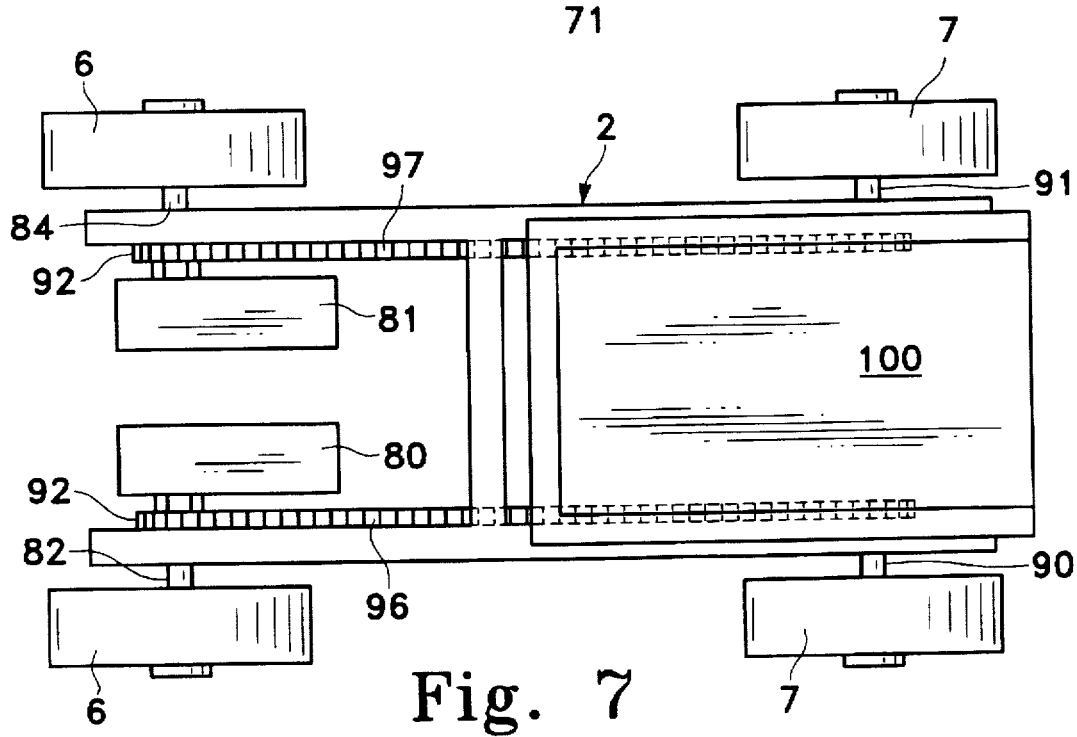

ADJUSTABLE POWERED WHEELCHAIR

This is a continuation in part of Ser. No. 08/191,629, filed Feb., 4, 1994, now abandoned.

This invention relates to powered wheelchairs and particularly to powered wheel chairs that have movable, extendible seats.

BACKGROUND OF THE INVENTION

Today, thousands of children and adults suffer from a variety of aliments that cause them to use wheelchairs. Most wheelchairs available today provided a limited range of motion for the user, i.e., the chairs provide basic locomotion and have fixed seats. For example, U.S. Pat. No. 5,193,633 describes a motorized transfer and transport system for the disabled. Although the device is an improvement over other prior art wheelchairs, it falls far short of providing the desired range of mobility. U.S. Pat Nos. 4,456,086 and 5,137,102 describe devices that are combination wheelchair and upright ambulator devices that use joy stick control switches that permit the user to control the movement of the devices. While these devices provide more mobility, they are limited to use on relatively flat and regular surfaces.

Powered wheelchairs with limited elevational variability of the seat are described in U.S. Pat. Nos. 5,209,322 and 4,613,151. These wheelchairs provide some degree of mobility and allow the user to lower the seat closer to floor level, and if the user is able to stretch and use his or her arms, to retrieve dropped objects. However, these chairs have many of the inherent disadvantages of conventional wheelchairs. For example, the chair described in U.S. Pat. No. 5,209,322 has a structure that prevents the user from approaching a table closely, even though the height variation feature is designed with counters and tables in mind. Although both of the powered chairs mentioned above allow the user to retrieve dropped objects, neither has the ability to allow the user to touch the ground with his or her feet.

U.S. Pat. Nos. 5,090,513 and 4,375,840 both describe powered seats that are movable into different positions but lack the desired flexibility and range of motion.

SUMMARY OF THE INVENTION

The present invention overcomes these difficulties and provides a powered wheelchair that offers a wide range of motion as well as a seat that can travel through an arctuate path of over 180 degrees. Moreover, the design of the wheelchair permits a unique operational stance when the seat is fully extended. In that position, the extended seat creates a moment arm counterbalanced by the weight of the chassis and battery pack. By adjusting the position of the battery pack, the user can make the wheelchair rotate about an axis through the front wheels in a controlled manner to balance the wheelchair on the front wheels. This new balance position can be maintained over some distance, providing additional mobility and an extension of the range of motion of the seat 5. This two wheel operation extends the operational capabilities of the device, as discussed below.

The present invention has a steerable, powered mobile base. The base has a motive means for propelling the base. The wheelchair also has two movable arms. The arms are attached to the mobile base at one end. The other ends of the arms are attached to a seat. The seat is attached to the arms with pivots that permit rotation of the seat in both vertical and horizontal planes. The arms can move through three positions. The first position is the at rest position. Here, the seat rests near or directly on the base. In this position, the invention is much like any other powered wheelchair. In the second position, the seat is spaced vertically above the mobile base. In the third position, the seat is extended forward of the mobile base and can rotate down to floor or ground level by using the balancing technique described above. The movement of the arms and seat through these positions is continuous, i.e., the seat can be positioned anywhere in this spatial continuum as desired. The seat may also be rocked or rotated independently of the motion of the arm of the mobile base. The seat, arms and mobile base are controlled through a control device operated by the user. The control device is preferably positioned on the seat arm rests, where the control is readily accessible to the user.

The mobile base has four wheels that may be operated in either two or four wheel powered drive configurations. Drive means for positioning the arms and the tilt of the seat are mounted on the mobile base.

A feature of the mobile base it that when the seat is in the third position, the mobile base can rotate vertically about a horizontal axis that passes through the front wheels. Thus, the user, by either shifting his or her weight and/or by adjusting the counter-balancing battery pack, can tilt the mobile base. This allows the wheelchair to furl on two wheels, increasing angular mobility. Moreover, by either shifting the user's weight or by using the controls to briefly propel the wheelchair forward or backward, the user can "bounce" Up and down. In this operational mode, the user can exercise his or her legs by bouncing them against the ground. Such bouncing while moving in a forward direction, can even simulate running, which helps exercise the user and provides an increased level of interaction and play.

It is an object of this invention to provide a powered wheelchair that can be adjusted in movement and position by the user.

It is another object of this invention to provide a mobile powered wheel chair that can traverse uneven terrain with stability.

It is yet a further object of this invention with sufficient adjustability to move the user through a wide range of motion allowing the user to reach high places and to alternatively reach the floor or ground level.

It is yet another object of this invention to provide a wheelchair that allows the user the ability to exercise lower limbs.

It is yet another object of this invention to provide a wheelchair that can be operated by rotating the chair forward so that it runs only on the front wheels of the wheelchair.

It is a further object of this invention to provide a wheelchair that has an adjustable counterweight system to permit operation by balancing on the front wheels over a wide range of ground surfaces.

It is yet a further object of this invention to provide a wheelchair that uses the battery power supply, mounted on a movable battery carrier, as the adjustable counterweight.

BRIEF DESCRIPTION OF THE DRAWINGS

FIG. 6 is a perspective view of the drive mechanism for rotating the seat about a vertical axis.

FIG. 7 is a detail view of the four wheel drive system for powering the mobile base.

DETAILED DESCRIPTION OF THE INVENTION

Figure 1:
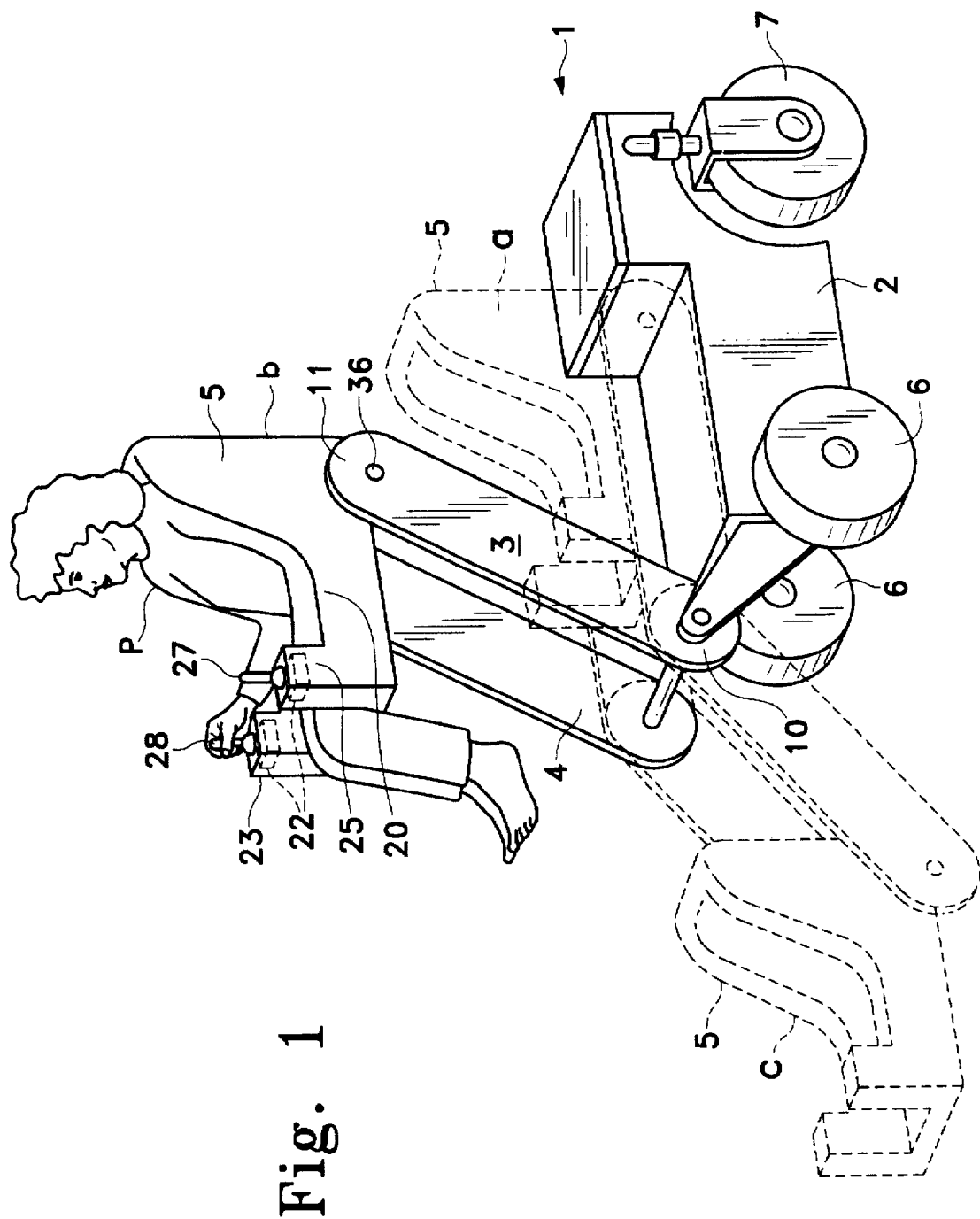
FIG. 1 is a pictorial perspective showing the chair in positions a, b, and c.

Referring now to FIG. 1, the wheelchair 1 provides wide ranges of mobility for the user. This ranges from being able to lift the user vertically above the chair, allowing access to shelves, for example, to being able to move the user forward and down to ground level. In the preferred embodiment, the wheelchair 1 has a mobile base 2, two movable arms 3 and 4 and a seat 5. In the preferred embodiment, the mobile base 2 has a two-wheel drive system that has a pair of powered front wheels 6 and a pair of rear wheels 7. The rotational direction and speed of each of the front wheels 6 are independently controlled to propel the wheelchair 1 in either a forward or rearward direction or to steer the wheelchair 1 in a desired direction. In this embodiment, the rear wheels 7 are neither powered or guided. A four-wheel drive embodiment is discussed below.

Figure 2:
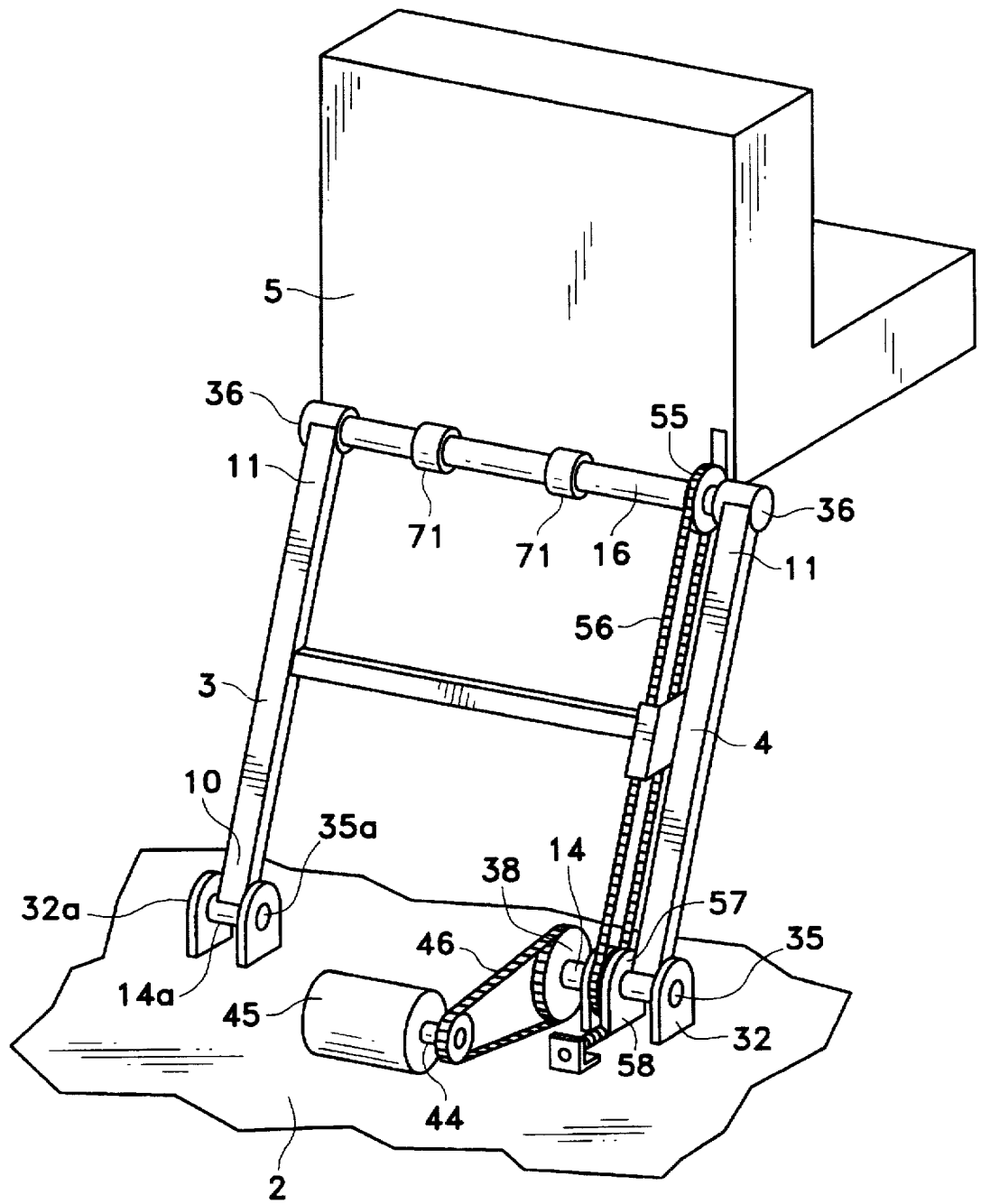
FIG. 2 is a perspective view of the mobile arm drive mechanism for powering one arm.
Figure 3:
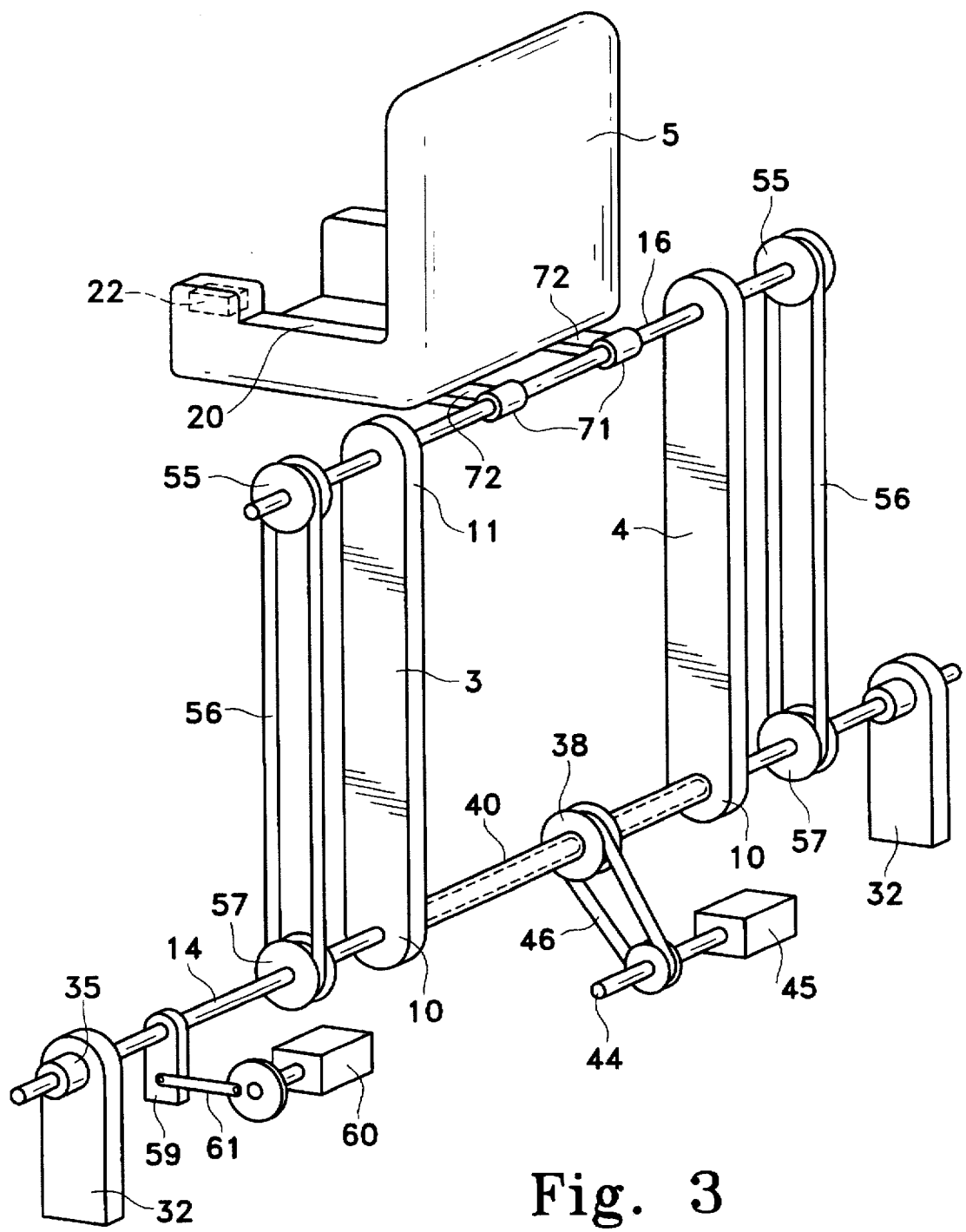
FIG. 3 is a detail of the double powered arm mechanism.

Referring now to FIGS. 1, 2, and 3, the arms 3 and 4 each have two ends 10 and 11 as shown. The ends 10 are pivotably connected to the mobile base 2 by a rotatable shaft 14 as shown. The ends 11 of the arms 3 and 4 are pivotably connected to the seat 5 by a second rotatable shaft 16.

Referring now to FIG. 1, the seat 5 has a pair of armrests 20 that support the arms of the user and carry a control assembly 22. The control assembly 22 is mounted in a protective housing 23, positioned at the outer end 25 of the arm rests 20 as shown. In the preferred embodiment, two joystick controllers, a left control 27 and a right control 28 are used. The user controls direction and speed of the mobile base 2 with the right control 28 and can control the movement of the seat 5 with the left control 27.

As illustrated in FIG. 1, the seat 5 is selectively movable between a first position a, a second position b, and a third position c. The first position a and the third position c are shown in dashed line on FIG. 1. Position a is similar to a normal powered wheelchair. Position b allows the user to reach above the chair as desired. Position c extends the seat 5 forward and down with respect to the mobile base 2. Position c allows the user to be seated at tables, for example, and to reach the ground. As discussed below, position c also allows the user to balance the wheelchair 1 on the front wheels 6, which can create a bouncing effect. In position c, the seat 5 is extended forward of the mobile base 2 and can rotate down to floor or ground level by using the balancing technique mentioned above and described below. Movement of the arms 3 and 4 and seat 5 through these positions is continuous, i.e., the seat 5 can be positioned anywhere in this spatial continuum as desired. In the preferred embodiment, discussed below, the seat 5 may also be tilted or rotated independently of the motion of the arms 3 and 4 of the mobile base 2.

Referring now to FIG. 2, the arms 3 and 4 are attached to the mobile base 2 by a bracket 32, which is attached to the frame of the base member by welding, or by bolt and nuts, or other similar fastening methods known in the art. FIG. 2 shows an embodiment in which only arm 4 is powered. In this embodiment, a drum or sprocket 38 is attached to the first rotatable shaft 14 a bearing 35 is attached to the bracket 32. The first rotatable shaft 14 is placed within the bearing 35 as shown. The drum or sprocket 38 is locked onto the first rotatable shaft 14 using a key or spline the drum or sprocket 38 is connected to shaft 44 of the drive motor 45 using a cable or chain 46 in a manner common to the art. The drive motor 45 is attached to the mobile base 2. The end 10 of the arm 3 is fixedly attached to rotatable shaft 14a, which is secured in a bracket 32a with bearings 35a. As the fixed ends 10 of arms 3 and 4 are rotated about the longitudinal axis passing through the rotatable shafts 14 and 14a, the ends 11 of the arms 3 and 4 move in an arctuate path, the radius of which is determined by the length of the arms 3 and 4.

The ends 11 of arms 3 and 4 are attached to bearings 36 as shown. A second rotatable shaft 16 is rotatably mounted in the bearings 36 as shown. Two seat clamps 71 are attached to the second rotatable shaft 16 as shown. These clamps 71 are discussed in greater detail below. For this discussion, however, the clamps 71 are keyed to the second rotatable shaft 16 such that as the second rotatable shaft 16 turns, the clamps 71 follow this rotation of the second rotatable shaft 16. A drum or sprocket 55 is connected by a cable or chain 56 to a drum or sprocket 57, having the same diameter as the drum or sprocket 55. In the embodiment of FIG. 2, drum or sprocket 57 is mounted to a non-rotatable shaft 14b, that is attached to bracket 58. During the rotational movement of the arms 3 and 4, the respective angular positions of drum or sprockets 55 and 57, and the angular relationship of the seat 5 with respect to the mobile base 2, are maintained in a constant relative position by the cabled connection between drum or sprockets 55 and 57, which act to control the rotation of the second rotatable shaft 16. Thus the seat 5 remains the in the same position (e.g., a horizontal position) over the range of the arctuate path discussed above.

FIG. 3 shows an embodiment where both arms 3 and 4 are powered. In this embodiment, the drum or sprocket 38 is keyed to a sleeve shaft 40 that is carried over the first rotatable shaft 14. The drum or sprocket 38 is connected to shaft 44 of the drive motor 45 using a cable or chain 46 in a manner common to the art. The drive motor 45 is attached to the mobile base 2. The ends 10 of the arms 3 and 4 are fixedly attached to the drive shaft 30 as shown. As the fixed ends 10 of arms 3 and 4 are rotated about the longitudinal axis passing through the sleeve shaft 30, the ends 11 of the arms 3 and 4 move in an arctuate path, the radius of which is determined by the length of the arms 3 and 4. As in the embodiment of FIG. 2, the seat 5 remains in a horizontal plane as the arms 3 and 4 move the seat 5 through the arctuate path discussed above.

Figure 4:
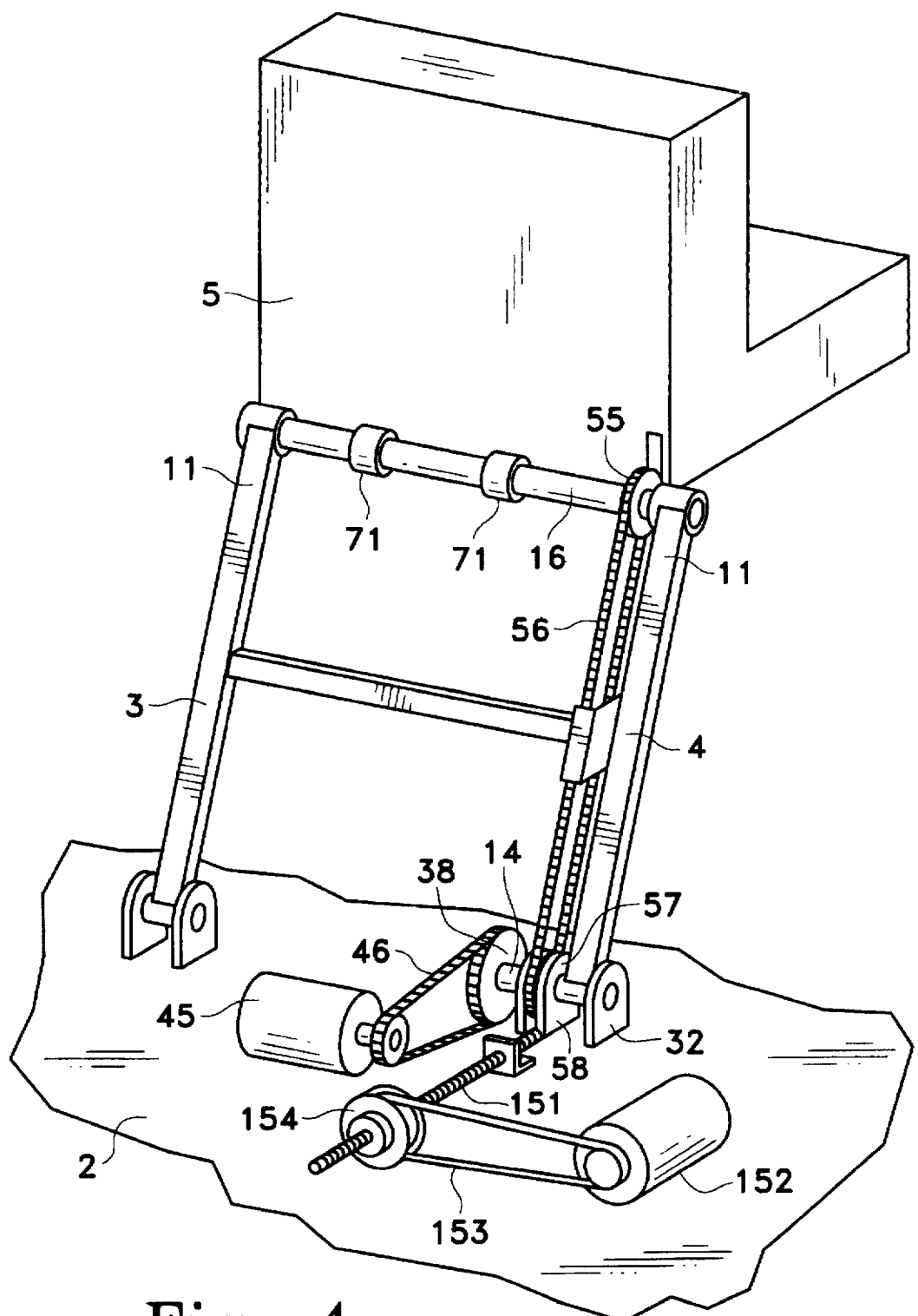
FIG. 4 is a detail showing one mechanism for rotating the seat about a first horizontal axis using the single arm powered configuration.
Figure 5A:
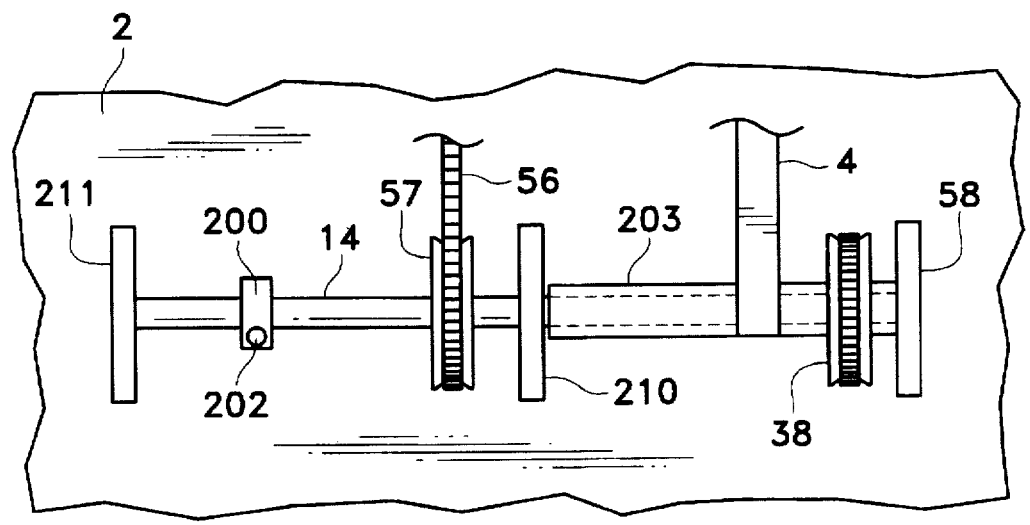
FIG. 5a is a side detail view of a second mechanism for rotating the seat about a first horizontal axis using the single arm powered configuration.
Figure 5B:
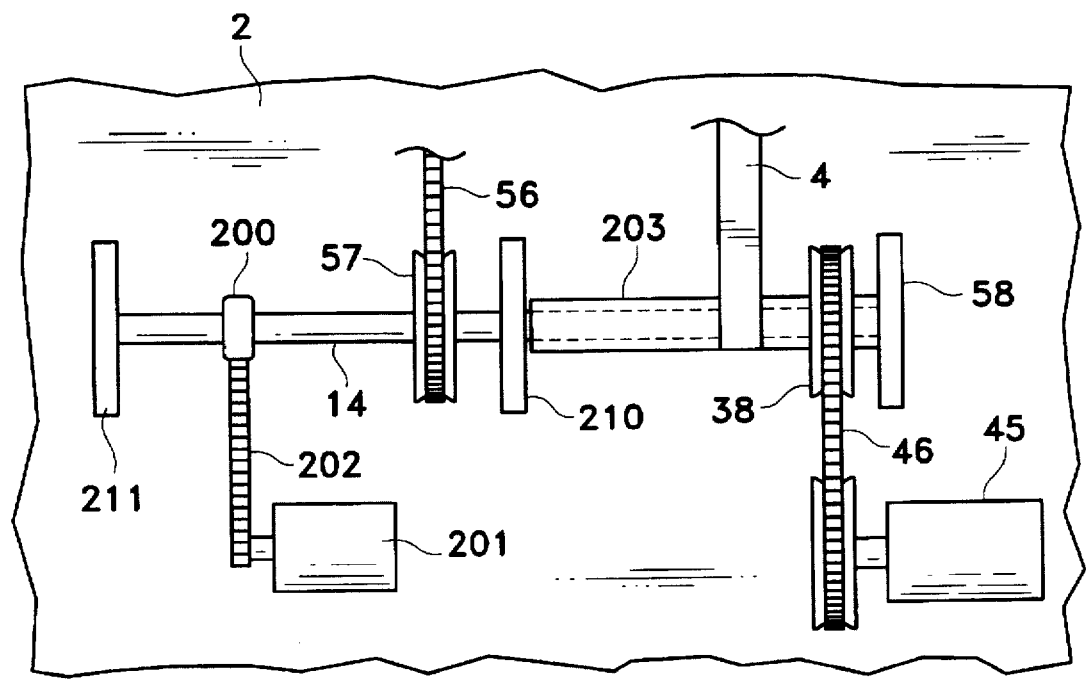
FIG. 5b is a top detail view of a second mechanism for rotating the seat about a first horizontal axis using the single arm powered configuration.
Figure 9A:
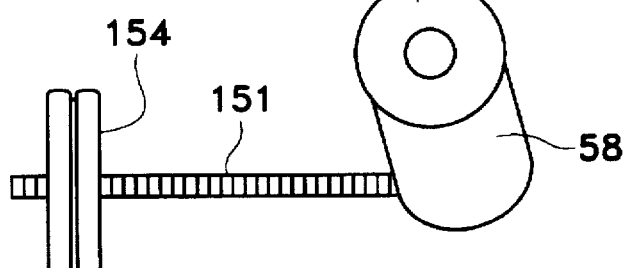
FIG. 9a is a detail of the seat rotating drive mechanism of FIGS. 4 and 5 in a neutral position.
Figure 9B:
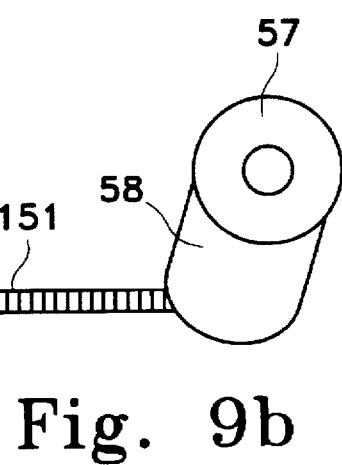
FIG. 9b is a detail of the seat rotating drive mechanism of FIGS. 4 and 5 in a rearward position.
Figure 9C:
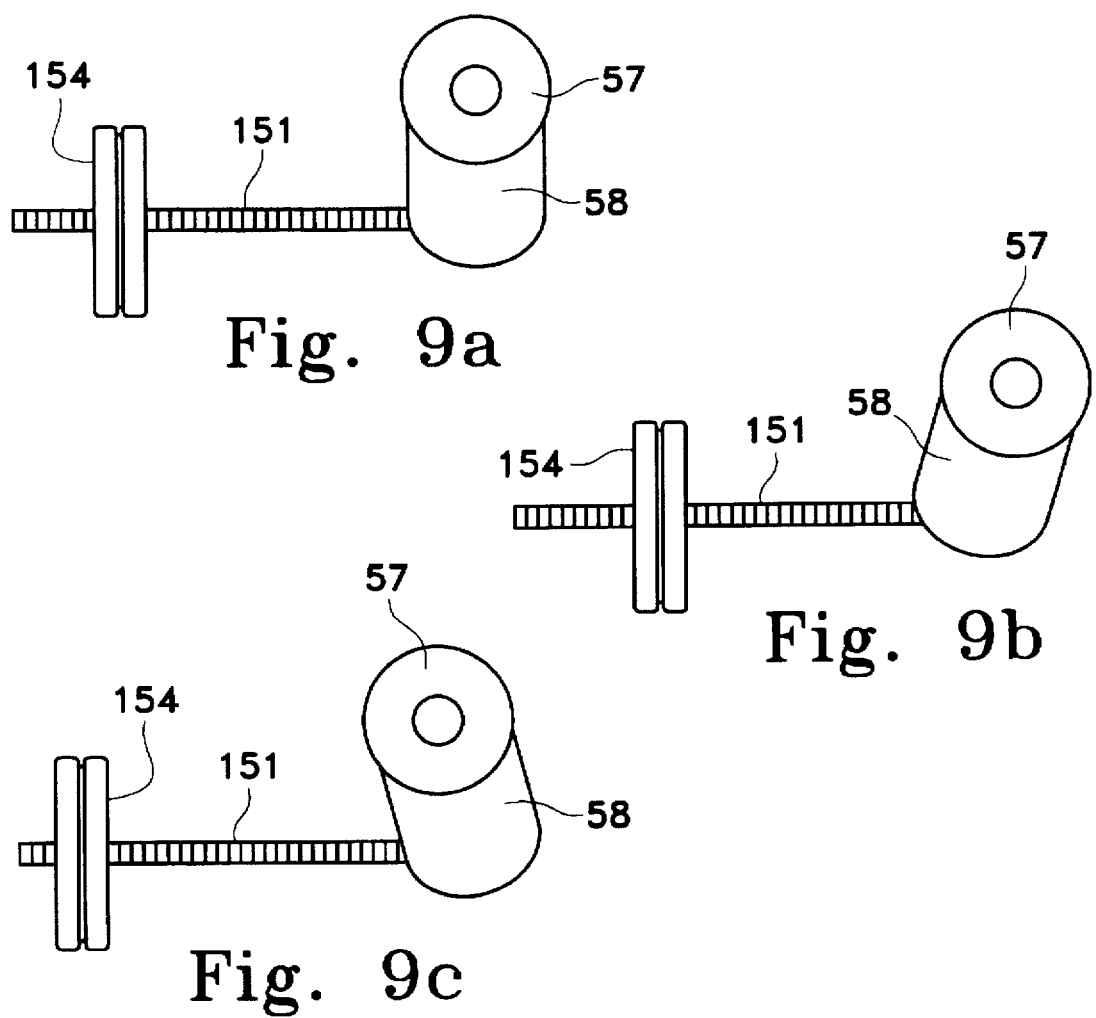
FIG. 9c is a detail of the seat rotating drive mechanism of FIGS. 4 and 5 in a forward position.

To ensure that the seat 5 acts in concert with the arms 3 and 4, the second rotational shaft 16 is attached to a drum or sprocket 55. Bearings 36 provide support for the shaft 16. The drum or sprocket 55 is connected by a cable or chain 56 to a drum or sprocket 57, having the same diameter as the drum or sprocket 55. Pulley 57 is keyed to the first rotatable shaft 14 as shown. Unlike the embodiment of FIG. 2, the embodiment of FIG. 3 shows a system to rotate the seat 5 about the second rotatable shaft 16. In this system, a lever 59 is provided that selectively enables the seat 5 to rotate the seat 5 about the horizontal axis of the second rotatable shaft 16. The lever 59 is connected to a second electric motor 60 by a tie rod 61. This systems enables the seat 5 to be maintained in a fixed relationship with respect to the floor or ground by selectively maintaining the motor 60 in a locked position with respect to the mobile base 2. This freezes the rotatable shaft 14, holding drum or sprocket 57 in a fixed position. The seat 5 can be tilted by operating the motor 60 to rotate the rotatable shaft 14, which causes drum or sprocket 57 to rotate, thereby rotating cable or chain 56, thereby rotating drum or sprocket 55, thereby turning shaft 16 and the seat 5. Because shaft 14 is placed inside of shaft 40, the motion of the arms 3 and 4 is independent of the motion of the seat 5 about the axis of shaft 16. Therefore, the seat 5 can be adjusted as desired while the arms 3 and 4 move through the arctuate path. This arrangement allows the seat 5 to move through a wide range of motion, including moving through 180 degrees of arc, and being able to tilt forward or backward (relative to the mobile base 2) at any point along the arc. Referring now to FIG. 4 an automatic adjustment device to permit the chair to be rotated on the rotatable shaft 16 for the embodiment of FIG. 2 is shown. FIG. 4 shows the embodiment of FIG. 2 with a control mechanism to rotate the seat 5 about an axis running through the second rotating shaft 16. To cause the seat 5 in this embodiment to rotate, the bracket 58 is rotated, thereby causing the fixed drum or sprocket 57 that is attached to bracket 58 rotate, thereby causing the drum or sprocket 55 to rotate, thereby rotating the second rotating shaft 16, which causes the seat 5 to rotate either upwards or downwards as desired. This motion is independent of the motion of the arms 3 and 4 as they move through the arctuate path discussed above. The system shown in the embodiment of FIG. 4 has the same basic components as those described for FIG. 2. In this embodiment, however, additional components required. First, the bracket 58 must be mounted to the mobile base 2 in a manner that permits the bracket 58 to be rotated in a forward or backward position. Mounting the bracket 58 to a pivot is the most direct method to achieve this. The bracket 58 is then controlled by a jack screw 151, that is attached to the bracket 58. An auxiliary electric motor 152 is attached to the mobile base 2. A drive belt, chain or cable 153 is attached to the motor 152 and the drive pulley, drum, or sprocket 153, which is attached to the jack screw 151. Thus, the motor 152, which is controlled from the seat 5 using controls mounted there, turns the jack screw 151, which pushes the bracket 58 either forward or backward, as desired, causing the bracket 58 to pivot and thereby rotate the drum or sprocket 57 in the sequence described above, causes the seat 5 to rotate about the shaft 16. FIGS. 9a, 9b, and 9c show the position of bracket 58 in three different pivoted positions that correspond to the operation described above. FIG. 9a is a detail of the seat rotating drive mechanism of FIGS. 4 and 5 in a neutral position. FIG. 9b is a detail of the seat rotating drive mechanism of FIGS. 4 and 5 in a rearward position. FIG. 9c is a detail of the seat rotating drive mechanism of FIGS. 4 and 5 in a forward position. FIGS. 5a and 5b show the details of an alternative method of rotating the seat 5 in the single powered embodiment shown in its basic form in FIG. 2. This method employees a shaft within a shaft, similar to that of the embodiment in FIG. 3. In the embodiment of FIG. 5, a lever 200 is provided that selectively enables the seat to rotate the seat 5 about the horizontal axis of the second rotatable shaft 16. The lever 200 is connected to a second electric motor 201 by a jack screw 202. As in the embodiment of FIG. 3, this systems enables the seat 5 to be maintained in a fixed relationship with respect to the floor or ground by selectively maintaining the motor 201 in a locked position with respect to the mobile base 2. This freezes the rotatable shaft 14, thereby holding drum or sprocket 57 in a fixed position. An outer sleeve shaft 203, is placed over the shaft 14 as shown. Intermediate support 210 and an end support 211 for shaft 14 have been added to support the shafts. Bearings are installed in these brackets in an identical manner to the other brackets, described above. A drum or sprocket 38 is connected to shaft 44 of the drive motor 45 using a cable or chain 46 in a manner common to the art. The drum or sprocket 38 is attached or keyed to the outer sleeve shaft 203, in an identical manner as the embodiment of FIG. 3. The drive motor 45 is attached to the mobile base 2. The end 10 of the arm 4 is fixedly attached to the drive shaft 203 as shown. Shaft 203 is operated in the same manner as that of shaft 40 in FIG. 3, discussed above. The seat 5 can be tilted by operating the motor 201 to rotate the rotatable shaft 14, which causes drum or sprocket 57 to rotate, thereby rotating cable or chain 56, thereby rotating drum or sprocket 55 thereby turning shaft 16 and the seat 5. Because shaft 14 is placed inside of shaft 203 the motion of the arms is independent of the motion of the seat 5 about the axis of shaft 16. Therefore, the seat 5 can be adjusted as desired while the arms 3 and 4 move through the arctuate path. This arrangement allows the seat 5 to move through a wide range or motion, including moving through 180 degrees of arc, and being able to tilt forward or backward (relative to the mobile base 2) at any point along the arc.

Although this discussion has centered on electric motors and cables or chains (with the appropriate drums or sprockets), the movement of the components described above is not limited to the use of electric motors. An hydraulic system can be substituted for the electric motors, with the associated changes in equipment, if desired.

Referring now to FIG. 6, the seat 5 is detachably mounted on a platform 70. The platform 70 is attached to the second iotatable shaft 16 by one or more clamps 71. The clamps 71 have extension 72 to support the platform 70. The platform 70 allows different size seats 5 to be mounted on the wheelchair 1 to accommodate different sized users. The seat 5 may also be rotatably attached to the platform 70. In this arrangement, a post 73 extends upwards from the platform 70 and engages a recess formed in, or attached to, the bottom of the seat 5. The post 73 allows the seat 5 to rotate about the vertical axis extending through the post 73 and the seat 5. The seat 5 can be rotated 90 degrees from center. Note also that in this position, the seat 5 can still rotate on the rotatable shaft 16 to achieve additional angular positions.

Figure 8:
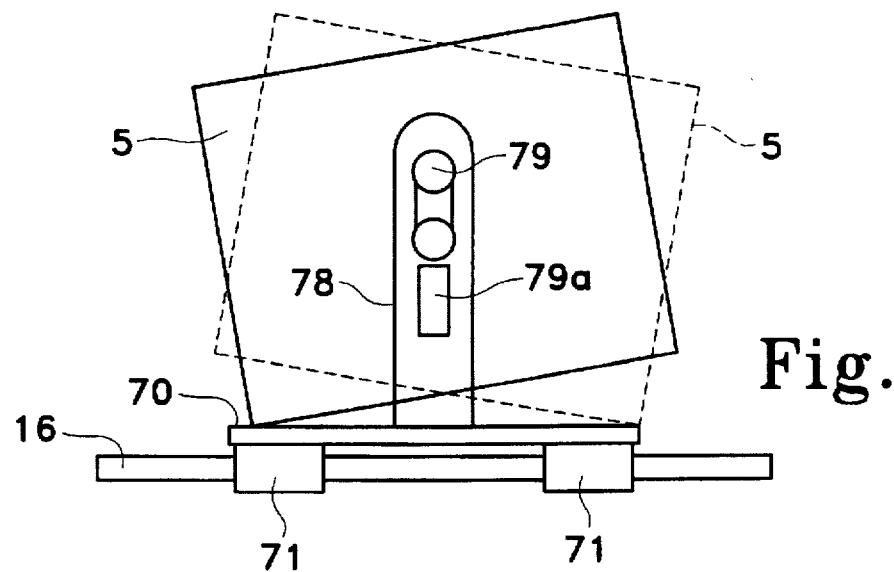
FIG. 8 is a detail of the mechanism for rotating the seat about a second horizontal axis being perpendicular to the first horizontal axis.

In the preferred embodiment, the rotation of the seat 5 can be controlled using a motor 74 mounted to the platform 70. A drum or sprocket 75 attached to the bottom of the seat 5. The drum or sprocket 75 attached to the post 73 when the seat 5 is installed on the platform 70. A drive cable 77 connects the motor 74 and the drum or sprocket 75. Thus, the seat 5 can be regulated by operating the motor 74 as desired. Referring now to FIGS. 6 and 8, a third pivot axis is included. In this embodiment, the seat 5 is mounted to a bracket 78 by a pin 79. A motor 79a controls the movement of the seat 5. When the motor 79a is synchronized with motor 74, a slow wave style rocking motion can be achieved, providing a therapeutic motion for the user. This configuration allows the seat 5 to rotate about three axis while the seat 5 is raised or lowered by the arms 3 and 4. Referring now to FIG. 7, in the preferred embodiment, the wheelchair 1 is powered by electric motors 80 and 81 carried on the mobile base 2. The left motor 80 and the right motor 81 are connected to respective drive shafts 82 and 84 (see FIG. 5). Each drive shaft 82 and 84 have a wheel 6 attached. Wheels 6 are mounted on the front end of the mobile base 2 as shown. A pair of stub shafts 90 and 91 are attached to a pair of rear wheels 7 as shown.

Two additional motors may be added to the rear wheels 7, making the unit a four-wheel drive. However, FIG. 5 shows the preferred embodiment for four-wheel operation. In this embodiment, sprockets 92 are attached to the drive shafts as shown. A left roller chain 96 and a right roller chain 97 are attached to the sprockets 92. This system enables the drive motors 80 and 81 to drive all four wheels.

In either the two or four wheel drive configurations, the motors 80 and 81 are powered by a battery pack 100 that is carried on the mobile base 2.

By mounting the battery pack 100 in an adjustable tray or carrier 120, the battery pack 100 may be shifted forward or backward as required to provide counterbalancing weight for the seat 5, especially when the seat 5 in the forward position c. This counterbalance permits the user to rotate the wheelchair 1 forward, so that it balances on the front wheels 6. This arrangement allows the wheelchair 1 to "bounce", enabling the user's feet to touch the ground. Moreover, if proper balance is reached, the user may operate the chair in the rotated position as desired for forward motion and to pivot the wheelchair 1 about the axis of the front wheel 6. The rotation about the front wheel axis is possible because of the balancing effect of the battery pack 100 and the seat 5. With the weight of the battery pack 100 set at a predetermined position the breaking of the forward motion of the forward motion of the wheelchair 1 results in inertial that causes the chair to rotate about the center of the front axles creating a balanced condition that can simulate a bouncing action or motion.

Figure 10:
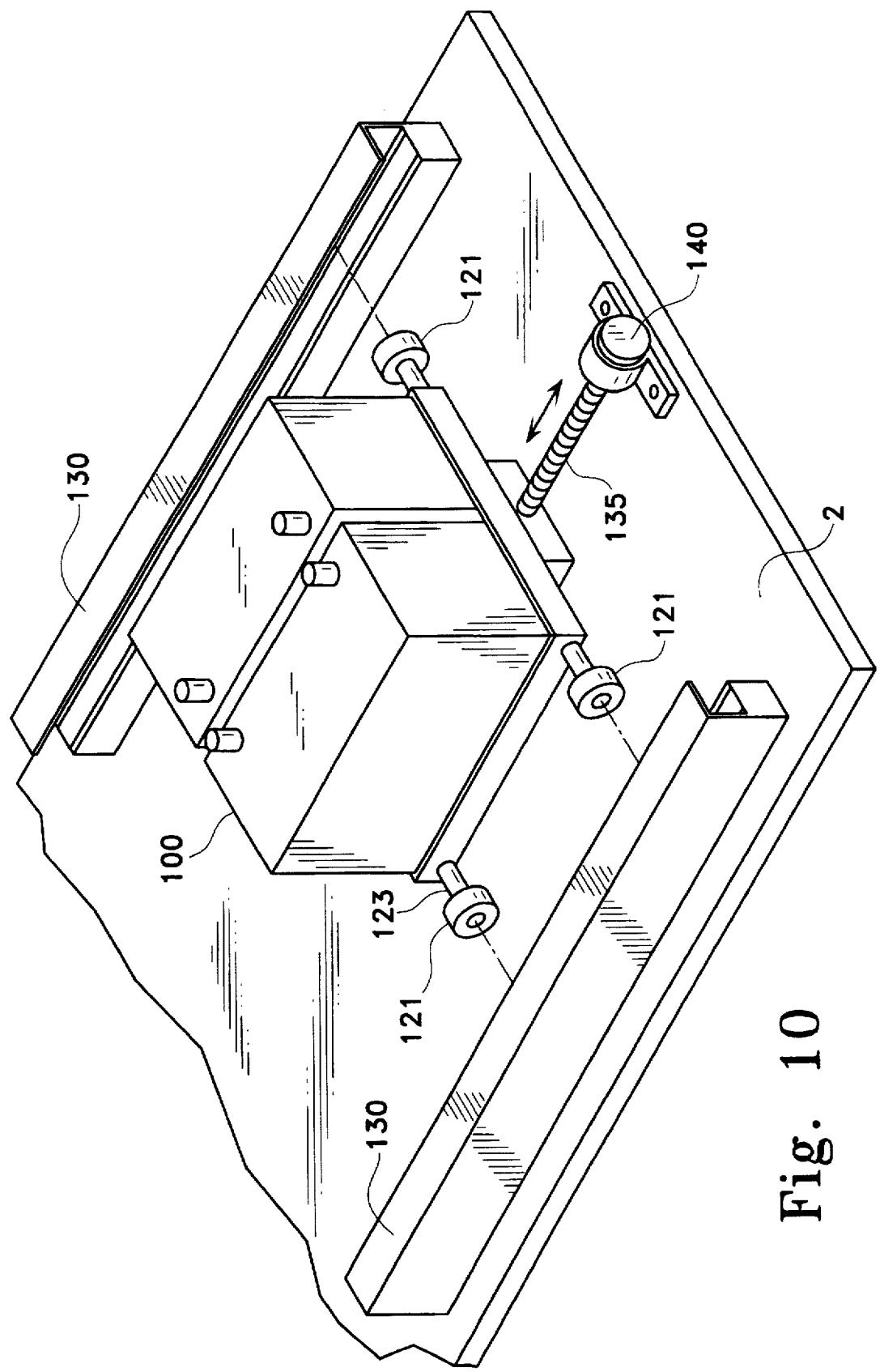
FIG. 10 is a detail view of the automatic battery positional adjustment mechanism.

FIG. 10 shows the preferred arrangement for mounting the battery pack 100. In this embodiment, the battery pack 100 is mounted on a carrier 120. The carrier 120 has four wheels 121 that are mounted on axles 123. The carrier 120 rides in a pair of tracks 130 that are mounted on the mobile base 2. The carrier 120 and the tracks 130 allow the battery pack 100 to be moved to any position within the tracks 130 on the mobile base 2. The battery pack 100 and carrier 120 are positioned by using a jack screw 135 or other form of drive. The jack screw 135 is turned by a stepping motor 140, or similar type of drive unit. The stepping motor 140 is fastened to the mobile base 2 using common fasteners known in the art. Alternatively, the carrier 120 can be mounted on slides rather than wheels. Use of slides may be preferred as the wheels may shift out of the tracks 130 under excessive vibration as the wheelchair 1 operates over rough ground.

As discussed below, the stepping motor 140 is controlled in the same manner as the other functions on the wheelchair 1. The battery mounting system works by controlling the stepping motor 140, which turns the jack screw 135. As the jack screw 135 turns, it either pushes or pulls the battery carrier 120 to the desired position. Once set, the jack screw 135 holds the battery carrier 120 in that position until further movement is desired.

As discussed above, the idea behind the setting the position of the battery carrier 120 is that the battery carrier 120 can act as a counterweight for the extended seat 5. However, unlike other counterweights that are designed to keep a particular vehicle stable and on all four wheels, this counterweight is designed to permit the user to rotate the wheelchair 1 forward so that it balances on the two front wheels 6. The position of the battery pack 100 maintains this balance so that as the wheelchair 1 is moved forward, the seat 5 is near the ground, allowing the user's legs to touch the ground. Depending on the type of terrain, the battery counterweight may have to be repositioned to maintain this balance. Moreover, if a different sized person occupies the chair, the battery pack 100 may have to be adjusted to accommodate the new user. Of course, any other similar type of control for the battery pack 100 may be substituted for the carrier 120 and jack screw 135 system described.

The operation of the wheelchair 1 is controlled by the user. As discussed above. The control assembly 22 is mounted in a protective housing 23, positioned at the outer end 25 of the arm rests 20 as shown. In this position, a conventional joystick controller 26 can be easily maneuvered by the user. In the preferred embodiment, two joystick controllers, a left control 27 and a right control 28 are used. The user controls direction and speed of the mobile base 2 with the right control 28 and can control the movement of the seat 5 with the left control 27. However, the specific application of the controls can be changed as desired. Such controllers are common to the art and are shown in U.S. Pat. Nos. 4,613,151 and 5,193,633, which are incorporated herein by reference for all purposes. Such electrical connections as needed to be made to operate the wheelchair 1 are within the scope of one of ordinary skill in the art and embodied in the references and will not be expounded upon here.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. An adjustable powered wheelchair for operation on a ground surface comprising:
   a) a mobile base having a frame and a plurality of wheels, rotably mounted to the frame;
   b) means for driving said mobile base, mounted on said mobile base, and being operatively connected to at lease one of the said plurality of wheels, said means for driving said mobile base further including:
   i) an electric motor, ii) at least one battery, electrically connected to said electric motor, and iii) means for adjustably mounting said battery on said mobile base such that said battery is positionable on said mobile base such that said battery acts as a counterweight to counterbalance the seat when said seat is in a forwardly extended position;
   c) a pair of movable arm members, each movable arm member having a first end and a second end, and wherein said first end of said pair of movable arm members are pivotably connected to said mobile base;
   d) a seat, movably attached to the second end of said pair of movable arm members, said seat being rotatable about a horizontal axis and maintainable in a predetermined relationship with respect to the ground surface during movement of said pair of movable arm members;
   e) a first means for rotating said pair of movable arm members about the first end of said pair of movable arm members thereby causing the second end of said pair of movable arm members and said seat to move along an arctuate path spaced from said first end of said pair of movable arm members; and f) a control means, operable by a user of said adjustable powered wheelchair to steeringly propel the mobile base and selectively move the pair of movable arm members.

2. The adjustable powered wheelchair of claim 1 wherein the first ends of said pair of movable arm members are mounted to a first rotatable shaft, and said seat is attached to the second ends of pair of movable arm members by a second rotatable shaft.

3. The adjustable powered wheelchair of claim 2 wherein said first means for rotating the pair of movable arm members includes an electric motor connected to said first rotatable shaft.

4. The adjustable powered wheelchair of claim 1 wherein the means for adjustably mounting said battery on said mobile base comprises: a mobile carrier, said mobile carrier including a flat mounting plate; a plurality of wheels, rotatably mounted to said mobile carrier; a track fixedly attached to said mobile base and in communication with said plurality of wheels on said mobile carrier; means for adjusting the position of said mobile carrier on said mobile base; and means for securing; said battery to said mobile carrier.

5. The adjustable powered wheelchair of claim 4 wherein the means for adjusting the position of said mobile carrier on said mobile base comprise: a jack screw, in rotatable communication with said mobile carrier; a stepper motor in rotational communication with said jack screw; and control means for operatively turning said stepper motor and thereby turn said jack screw to move said carrier to a desired counterbalancing position on said mobile base such that the user may cause said mobile base to rotate forward and maintain the forwardly extended position as desired..

6. The adjustable powered wheelchair of claim 1 wherein only one of said pair of movable arm members is powered.

7. The adjustable powered wheelchair of claim 1 further comprising a bracket and pin to permit the seat to rotate about a horizontal axis passing longitudinally through the seat.

8. The adjustable powered wheelchair of claim 1, wherein said seat includes two armrests extending substantially parallel to a seating surface of said seat.

9. The adjustable powered wheelchair of claim 8 wherein said control means is mounted on at least one of said armrests.

10. The adjustable powered wheelchair of claim 9 wherein said control means includes:
   a) a first joy stick, mounted on one of said armrests, being operatively connected to said means for driving said mobile base; and
   b) a second joy stick mounted on the other of said armrests, being operatively connected to said first means for rotating said pair of movable arm members about the first ends of said pair of movable arm members.

11. The adjustable powered wheelchair of claim 1 wherein said adjustable powered wheelchair includes a second means for selectively rotating said seat about a horizontal axis running latitudinally through the seat.

12. The adjustable powered wheelchair of claim 1 wherein said adjustable powered wheelchair includes a third means for selectively rotating said seat about a vertical axis passing through said seat.

13. The adjustable powered wheelchair of claim 1 wherein said means for driving said mobile base is operatively connected to two wheels mounted on said mobile base.

14. The adjustable powered wheelchair of claim 1 wherein said means for driving said mobile base is operatively connected to four wheels mounted on said mobile base.

15. An adjustable powered wheelchair having a controllably moveable base and a seat, rotatably mounted on said controllably moveable base, said seat including a pair of arm members, each arm member having a first end and a second end, said first end of each arm member being connected to said controllably moveable base by a first rotatable shaft, forming a first pivot joint between the controllably moveable base and the seat, said seat being connected to the second ends of said pair of arm members by a second rotatable shaft, forming a second pivot joint; said seat also being selectively movable between a first position in contact with said controllably moveable base, a second position spaced vertically above said controllably moveable base, and a third position spaced in front of said controllably moveable base and adjacent a floor or ground surface supporting said adjustable powered wheelchair; said adjustable powered wheel chair further including a means for steerably propelling said controllably moveable base, having i) at least one electric motor, ii) at least one battery, electrically connected to said electric motor, and iii) means for adjustably mounting said battery on said controllably moveable base such that said battery is positionable on said controllably moveable base, and further such that said battery acts as a counterweight to counterbalance the seat when said seat is in an extended position.

16. The adjustable powered wheelchair of claim 15 wherein said pair of arm members have a length, and further such that said seat is moved along an arctuate path about the first pivot joint in response to moving said pair of arm members, said arctuate path defining an arc having an included angle of more than 180 degrees and a radius defined by said length of said pair of arm members.

17. The adjustable powered wheelchair of claim 16 further comprising;
   a) a means for moving said pair of arm members along said arctuate path;
   b) a means for selectively rotating said seat about a horizontal axis; and
   c) a means for controlling said means for steerably propelling said controllably moveable base, said means for moving said pair of arm members along an arctuate path, and said means for selectively rotating said seat.

18. The adjustable powered wheelchair of claim 15 wherein the means for adjustably mounting said battery on said controllably moveable base comprises: a mobile carrier, said mobile carrier including a flat mounting plate; a plurality of wheels, rotatably mounted to said mobile carrier; a track fixedly attached to said controllably moveable base and in communication with said plurality of wheels on said mobile carrier; means for adjusting the position of said mobile carrier on said controllably moveable base; and means for securing said battery to said mobile carrier.

19. The adjustable powered wheelchair of claim 18 wherein the means for adjusting a position of said mobile carrier on said controllably moveable base comprise: a jack screw, in rotatable communication with said mobile carrier; a stepper motor in rotational communication with said jack screw; and control means for operatively turning said stepper motor and thereby turning said jack screw to move said mobile carrier to a desired counterbalancing position on said controllably moveable base such that a user may cause said controllably moveable base to rotate to a forward based position and maintain the forward-based position as desired.

* * * * *